March 31, 1931.  B. AMES  1,798,577
AUTOMOBILE WINDOW CURTAIN CONTROLLER
Filed May 29, 1929
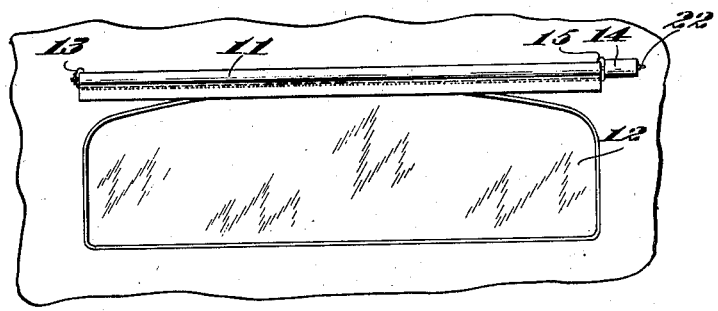
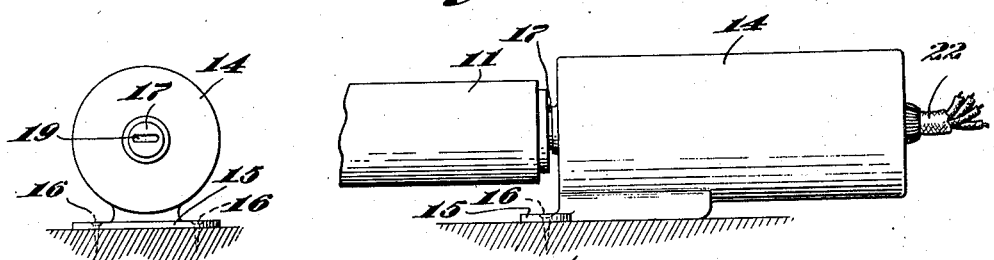
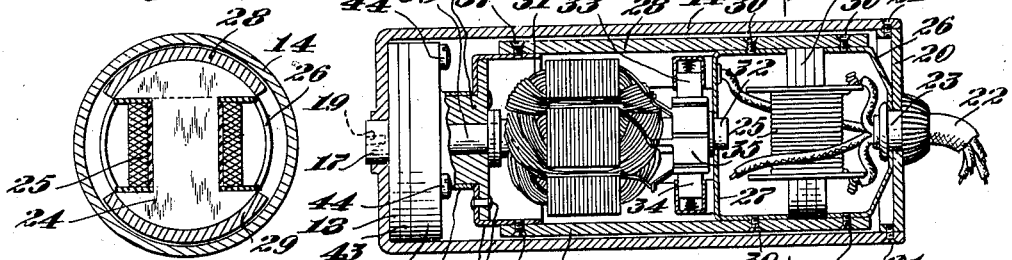
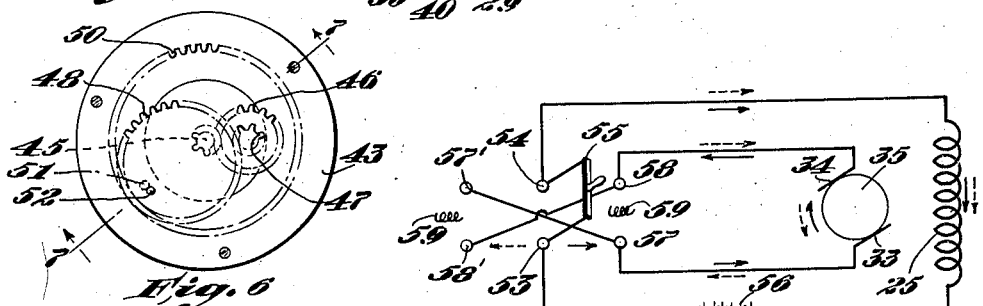
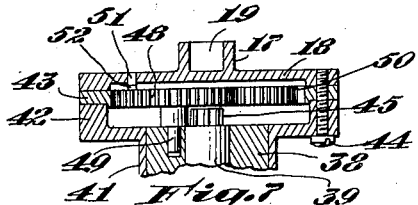
Inventor
Butler Ames
by Roberts, Cushman & Woodbury
Attys.

Patented Mar. 31, 1931

1,798,577

UNITED STATES PATENT OFFICE

BUTLER AMES, OF LOWELL, MASSACHUSETTS

AUTOMOBILE WINDOW-CURTAIN CONTROLLER

Application filed May 29, 1929. Serial No. 366,924.

This invention relates to electric motors for raising and lowering roller curtains such as the window shades of automobiles, or the like, and the principal object of the invention is to provide a compact and efficient reversible motor so constructed that it may readily be substituted in place of the roller mountings at one end of the curtain and may be operated by a remote switch to rotate the roller in either direction as desired.

Another object is to furnish reduction gearing within the motor casing and means associated therewith, arranged to reduce the speed of rotation of the roller and automatically to stop said rotation when the curtain has reached its extreme upper or lower positions. Further objects reside in the improved features of structure and arrangement of the motor elements hereinafter described and pointed out in the appended claims, whereby a motor constructed in accordance with this invention may be economically manufactured, readily assembled and mounted within a cylindrical casing of small size and neat appearance.

A recommended embodiment of the invention is shown for the purpose of illustration in the accompanying drawings, in which:

Fig. 1 is an elevation of an automobile window curtain equipped with the improved motor;

Fig. 2 is an enlarged elevation of the motor and curtain roller;

Fig. 3 is an end view of the motor showing the roller-connecting hub thereof;

Fig. 4 is a central longitudinal section of the motor with parts shown in elevation;

Fig. 5 is a section taken on line 5—5 of Fig. 4;

Fig. 6 is a sectional view illustrating the reduction gearing;

Fig. 7 is a section taken on line 7—7 of Fig. 6; and

Fig. 8 is schematic wiring diagram illustrating the motor switch and motor circuits.

The roller curtain 11 to which the improved motor is operatively connected may be mounted above the window 12 of an automobile, or arranged at any suitable location. In the usual installation the roller is supported by brackets 13 having recesses receiving axial projections at the opposite ends of the roller, and one of said projections is tongue-shaped and is held against angular movement by the complemental recess of its supporting bracket. The motor is adapted to be substituted for the last-named bracket and to engage the said projecting tongue to support the roller end and revolve the roller by rotating said tongue. Accordingly, the motor casing 14 preferably has a base 15 arranged to be mounted in place of said bracket and having openings to receive the screws 16 which formerly secured the bracket. Hence it is not necessary to drill new screw holes or to provide special attachments for connecting the motor to the curtain roller.

The casing 14 is preferably cylindrical and has a closed end centrally apertured to provide a bearing for the hub 17 of an interior rotatable plate 18. Said hub has a slot or recess 19 shaped to receive the projecting tongue of the roller, as aforesaid. The plate 18 constitutes one end of the motor assembly which is housed within the casing, a disc 20 being provided to support the opposite, outer end of the assembly and to serve as a closure for the open end of the casing. The disc 20 may be removably secured by screws 21, and may have a central aperture to admit a wiring cable 22 through a collar 23.

The magnetic core 24 and wiring 25 of the motor field are mounted adjacent the said open end of the casing within a cage comprising oppositely directed cups or spacer members 26 and 27, the cup 26 being secured to the cover 20 by the flanged collar 23. The two spacers are attached to diametrically opposite, curved conducting plates 28 and 29, as by screws 30, said plates being mounted on opposite ends of the core 24 extending toward the inner end of the casing above and below the motor armature 31 to carry the field flux thereto. The armature may be of any usual construction, but is preferably designed for direct current. An axial opening in cup or spacer 27 forms a bearing for one end 32 of the armature shaft; and said cup also has openings for the wires leading to the brushes 33 and 34 of the adjacent commutator 35.

Another spacer 36 is fastened between the inner ends of the plates 28 and 29, as by screws 37, and a bearing 38 for the opposite end 39 of the armature shaft is affixed to said cup by rivets 40. The bearing 38 also constitutes a journal for the sleeve 41 of a rotatable, cupped disc 42. An internal gear 43 is fastened between disc 42 and the end plate 18 by screws 44, and these members furnish a revolving gear box for the motor reduction gearing.

The gear train may be arranged in the following manner: the small spur 45 at the end 39 of the armature shaft meshes with a larger spur 46 of a gear journaled in the face of the bearing 38, and which has a smaller spur 47 meshing with a larger gear 48 also journaled in the bearing 38 as at 49. The teeth of gear 48 mesh with the internal teeth 50 of ring 43. Hence the ring 43 and the hub 17 of plate 18 to which the ring is attached are revolved at a speed substantially less than that of the armature shaft, and the roller 11 which is operatively connected to said hub is driven at a reasonably slow speed while the motor is in operation.

In order to stop the effective operation of the motor when the curtain has arrived at its lowermost or uppermost position, mutually engaging abutments are preferably provided in association with the gearing to stop rotation of the gears after a predetermined number of revolutions of the end or driving plate 18. Accordingly an inwardly projecting pin 51 is fixed in the plate 18 and a complemental pin 52 projects from the face of gear 48 in the path of movement of the pin 51. The pins may be so arranged that the plate 18 will make a definite number of revolutions, for example four, before the pins meet each other to stop movement of the gear train. At such time, the curtain will have covered the window, and the operator may then release the motor switch to shut off the current supply. The elevation of the curtain is effected and stopped in a similar manner by reversing the motor as hereinafter described.

The electric wiring for the motor preferably comprises a four wire system, associated with a double throw, double pole switch, so that the motor may be reversed when desired, and a suitable current source such as the battery of an automobile. As indicated in Fig. 8, one pair of wires may connect the terminals of the field winding 25 with the terminals 53 and 54 of the switch arm 55 through the battery 56; and the other pair may connect the commutator brushes 33 and 34 with the double poles 57, 57' and 58, 58', respectively of the switch. Hence the motor may be revolved in either direction according to the direction of throw of the switch arm 55. For example if the arm is closed upon switch terminals 57 and 58, the current will flow as shown by the full-line arrows, causing the motor to revolve in one direction; whereas if the terminals 57' and 58' are closed, the flow will be in the direction of the broken arrows, effecting an opposite rotation of the motor shaft. Obviously, the same result may be attained by reversing the field of the motor, rather than the armature as in the diagram.

When the motor is used to operate the curtain at a rear window of an automobile, the switch will ordinarily be mounted on the instrument panel in front of the driver's seat, and the switch is preferably held in normal open position as indicated by the springs 59 of Fig. 8. In practice, a simple and attractive form of toggle switch of known type may be employed, and the switch may be so arranged that upward tilting of the lever will raise the curtain, while a downward movement thereof will lower the curtain. The operator may hold the lever in the desired position against the spring which tends to open the switch, until the click of the motor stop pins warns him that the motor has stopped its effective operation; or the switch may be released at any time when the curtain is at the desired position.

The electrical operation of the motor is well understood and its mechanical operation will be apparent from the foregoing description. It is also evident that the component parts of the motor may be quickly and easily assembled in the form of a compact unit before placing the assembly within the casing. After insertion into the small and attractive casing, the motor assembly is supported by the bearing of hub 19 at one end and by the collar 23 of the removable cover 20 at the opposite end, without other interior supports of fastening members. The encased motor occupies very little space when connected to the curtain rod in the manner above described, and operates quietly and efficiently to perform its intended function.

Although the motor herein described is adapted especially for use with roller curtains as above set forth, it will be obvious that a motor embodying the features of this invention may be satisfactorily employed for other purposes, and that structural details may be varied for the intended uses without departing from the essence of the invention as defined in the appended claims.

I claim:

1. An electric motor comprising an armature having a rotatable shaft, a field magnet spaced axially from the armature and having a radial core, a pair of conducting plates on opposite ends of the core and extending longitudinally over opposite sides of the armature, and radially disposed spacers connecting said plates and in engagement with opposite sides of the core for spacing the latter longitudinally, one of said spacers providing a bearing for said shaft.

2. An electric motor comprising a cylindrical casing, fixed and removable end walls for the casing, a motor assembly disposed within the casing and supported by the opposite end walls of the casing, the supporting means at one end consisting of a driving hub projecting through and journaled in said fixed end wall, and reduction gearing operatively connecting said hub with the motor.

3. An electric motor comprising a casing, a motor assembly disposed within the casing, means for supporting the motor assembly for rotary motion relative to the casing, a driving hub extending through one end of the casing, gearing within the casing operatively connecting said hub and said motor assembly, and means for locking said gearing for automatically stopping the operation of the motor after a predetermined number of revolutions of the hub.

4. An electric motor comprising a cylindrical casing, an armature having a rotatable shaft, a field magnet spaced axially from the armature and having a radial core, a pair of curved conductor plates mounted on opposite ends of said core and extending longitudinally over opposite sides of the armature, radially disposed spacers connecting said plates and providing bearings for the armature shaft, one of said spacers being located between the armature and its field, and a spacing member arranged at the opposite end of the field and secured to said plates, said one of said spacers and said spacing member being in engagement with opposite sides of the core to position the latter longitudinally, all of said motor parts being contained within the casing.

5. An electric motor comprising a cylindrical casing, an armature having a rotatable shaft, a field magnet spaced axially from the armature and having a radial core, a pair of curved conductor plates mounted on opposite ends of said core and extending longitudinally over opposite sides of the armature, radially disposed spacers connecting said plates and providing bearings for the armature shaft, one of said spacers being located between the armature and its field, and a spacing member arranged at the opposite end of the field and secured to said plates, all of said motor parts being contained within the casing and the last named spacing member being secured to one end thereof, the opposite end of the casing having an axial aperture, and a hub journaled in said aperture and operatively connected to the armature shaft, the motor elements being supported within the casing at the opposite ends thereof by said hub and said spacing member respectively.

6. An electric motor comprising a cylindrical casing, an armature having a rotatable shaft, a field magnet spaced axially from the armature and having a radial core, a pair of curved conductor plates mounted on opposite ends of said core and extending longitudinally over opposite sides of the armature, radially disposed spacers connecting said plates and providing bearings for the armature shaft, one of said spacers being located between the armature and its field, and a spacing member arranged at the opposite end of the field and secured to said plates, all of said motor parts being contained within the casing and the last named spacing member being secured to one end thereof, the opposite end of the casing having an axial aperture, a hub journaled in said aperture and operatively connected to the armature shaft, the motor elements being supported within the casing at the opposite ends thereof by said hub and said opening member respectively, reduction gearing interposed between said hub and said shaft, and means associated therewith for automatically stopping the operation of the motor when the hub has turned a predetermined number of revolutions.

7. An electric motor comprising a cylindrical casing having a centrally apertured closed end, a motor assembly within the casing, comprising an armature having a rotatable shaft, a bearing for one end of said shaft, a gear on said shaft end, a cupped disc rotatable around said bearing, an internally geared ring fast to the peripheral edge of said disc, an end plate secured to the opposite side of said ring and having a hub journaled in the aperture of the casing end, gearing operatively connecting the shaft gear with the ring gear, a magnetic field spaced axially from the armature adjacent the opposite end of the casing and having a radial core, a pair of curved conducting plates mounted on the opposite ends of said core and extending longitudinally toward the closed end of the casing in spaced relation to the armature, and radially disposed spacing members connecting said plates, one of said members being affixed to said shaft bearing, and another having a central aperture providing a bearing for the opposite end of said shaft, the motor assembly being insertible as a unit within the opposite open end of the casing, and a cover for said end, said cover being connected to the assembly so that the assembly is supported within the casing by the cover at one end thereof and by the journaled hub at its opposite end.

8. An electric motor comprising a cylindrical casing having a centrally apertured closed end, a motor assembly within the casing, comprising an armature having a rotatable shaft, a bearing for one end of said shaft, a gear on said shaft end, a cupped disc rotatable around said bearing, an internally geared ring fast to the peripheral edge of said disc, an end plate secured to the opposite side of said ring and having a hub journaled in the aperture of the casing end, gearing operatively connecting the shaft gear with the ring gear, a magnetic field spaced axially from the armature adjacent the opposite end of the casing and having a radial core, a pair of curved conducting plates mounted in the opposite ends of said core and extending longitudinally toward the closed end of the casing in spaced relation to the armature, and radially disposed spacing members connecting said plates, one of said members affixed to said shaft bearing, another being disposed between the armature and its field and having a central aperture providing a bearing for the opposite end of said shaft, and a third being disposed at the outer, open end of the casing, a cover for said open end, and a tubular fastening member connecting the last named spacing member to said cover and furnishing an entrance for an electric cable, the motor assembly and cover being insertible as a unit within the casing and being supported therein by the cover at one end and by the journaled hub at the opposite end of the casing.

Signed by me at Boston, Massachusetts, this eighth day of May, 1929.

BUTLER AMES.